United States Patent
Petre (10) Patent No.: US 6,447,281 B1
(45) Date of Patent: Sep. 10, 2002

(54) BLOW MOLD SHELL AND SHELL HOLDER ASSEMBLY FOR BLOW-MOLDING MACHINE

(75) Inventor: Patrick Petre, Cauville sur Mer (FR)

(73) Assignee: Sidel, Inc., Norcross, GA (US)

( * ) Notice: Subject to any disclaimer, the term of this patent is extended or adjusted under 35 U.S.C. 154(b) by 0 days.

(21) Appl. No.: 09/394,363

(22) Filed: Sep. 10, 1999

Related U.S. Application Data (60) Provisional application No. 60/099,998, filed on Sep. 11, 1998.

(51) Int. Cl.[7] .......................... B29C 49/64; B29C 49/48
(52) U.S. Cl. ....................... 425/195; 425/522; 425/526; 249/79; 249/102
(58) Field of Search ............................ 249/79, 80, 102; 425/195, 408, 522, 541, 526

(56) References Cited

U.S. PATENT DOCUMENTS

| | | | |
|---|---|---|---|
| 467,881 A | | 1/1892 | Fisher |
| 1,409,591 A | | 3/1922 | Schavoir |
| 2,790,994 A | | 5/1957 | Cardot et al. |
| 2,959,812 A | * | 11/1960 | Allen |
| 3,191,225 A | | 6/1965 | Polka |
| 3,380,121 A | | 4/1968 | Chittenden et al. |
| 3,601,858 A | | 8/1971 | Blanchard |
| 3,632,249 A | * | 1/1972 | Pearson |
| 3,651,186 A | | 3/1972 | Hall |
| 3,753,641 A | | 8/1973 | Turner et al. |
| 3,768,948 A | | 10/1973 | Horberg, Jr. et al. |

(List continued on next page.)

FOREIGN PATENT DOCUMENTS

| | | |
|---|---|---|
| DE | 1916129 | 10/1969 |
| DE | 2545130 | 4/1977 |
| DE | 2545131 | 4/1977 |

(List continued on next page.)

OTHER PUBLICATIONS

"Quick–Change Systems Add to Blow Molders' Market Reach," by Patrick A. Toensmeier, Modern Plastics International, Aug. 1991 (pp. 30–31).
Patent Abstracts of Japan, vol. 12, No. 286 (M–727), Aug. 5, 1988 (Abstract of Japanese Reference 63–062, 710, dated Mar. 19, 1988).

(List continued on next page.)

*Primary Examiner*—Robert Davis
(74) *Attorney, Agent, or Firm*—Alston & Bird LLP (57) ABSTRACT

A blow mold assembly is provided that comprises a blow mold shell, a mold holder and a mold holding assembly. The blow mold shell having a first annular groove disposed within the lengthwise exterior surface of the shell. The first annular groove serves as a mating surface for a support harness that positions the mold shell within the blow mold assembly. Additionally, the blow mold shell may comprise a shoulder insert that may include an independent cooling channel. The blow mold assembly comprises a mold holder that includes arcuate interior surfaces and arcuate exterior surfaces so as to create a concentric blow mold holder. The mold holder may comprise a pressure compensation element that is capable of compensating for the pressure build-up within the mold shell during the blow mold process. The blow mold assembly also comprises a blow molding holding assembly that comprises clamping brackets having arcuate inner surfaces for mating with the arcuate exterior surfaces of the mold holder or mold shell. The clamping brackets are pivotally driven by a cam apparatus within a blow-molding machine and serve to open and close the blow mold assembly as warranted by the fabrication process. The blow mold shell assembly may also comprise a mold shell and a mold holding assembly. In applications not requiring a mold holder, the mold holding assembly comprises clamping brackets having an arcuate inner surface and the arcuate inner surface of the clamping brackets are disposed circumferentially about the exterior surface of the blow mold shell. The invention also comprises the individual components of the blow holding assembly.

39 Claims, 10 Drawing Sheets

U.S. PATENT DOCUMENTS

| | | | |
|---|---|---|---|
| 3,784,344 A | | 1/1974 | Korsch |
| 3,802,823 A | | 4/1974 | Doughty et al. |
| 3,807,928 A | | 4/1974 | Horberg, Jr. et al. |
| 3,843,286 A | | 10/1974 | Horberg, Jr. et al. |
| 3,854,855 A | | 12/1974 | Pollock et al. |
| 3,857,660 A | * | 12/1974 | Flynn et al. ................ 425/526 |
| 3,871,611 A | | 3/1975 | Taketa |
| 3,993,427 A | | 11/1976 | Kauffman et al. |
| 4,009,979 A | | 3/1977 | Martin |
| 4,035,463 A | | 7/1977 | Rosenkranz et al. |
| 4,046,498 A | | 9/1977 | Appel et al. |
| 4,072,456 A | | 2/1978 | Appel et al. |
| 4,092,097 A | | 5/1978 | Appel et al. |
| 4,117,050 A | | 9/1978 | Appel et al. |
| 4,120,636 A | | 10/1978 | Appel et al. |
| 4,151,976 A | | 5/1979 | Schurman |
| 4,213,750 A | * | 7/1980 | Kubota et al. ............. 425/540 |
| 4,233,022 A | | 11/1980 | Brady et al. |
| 4,268,242 A | | 5/1981 | Natter |
| 4,318,882 A | | 3/1982 | Agrawal et al. |
| 4,357,288 A | | 11/1982 | Oas et al. |
| 4,472,128 A | | 9/1984 | Ruhl |
| 4,500,275 A | | 2/1985 | Ruhl |
| 4,568,263 A | | 2/1986 | Ruhl |
| 4,701,121 A | | 10/1987 | Jakobsen et al. |
| 4,714,421 A | | 12/1987 | D'Agostino |
| 4,790,741 A | | 12/1988 | Takakusaki |
| 4,822,543 A | | 4/1989 | Iizuka et al. |
| 4,834,642 A | * | 5/1989 | Voss et al. .................. 425/541 |
| 4,861,542 A | | 8/1989 | Oles et al. |
| 4,872,827 A | | 10/1989 | Noda |
| 5,041,247 A | | 8/1991 | Kim |
| 5,064,366 A | * | 11/1991 | Voss ........................... 425/541 |
| 5,096,404 A | | 3/1992 | Janos et al. |
| 5,116,450 A | | 5/1992 | Spoo et al. |
| 5,255,889 A | | 10/1993 | Collette et al. |
| 5,256,341 A | | 10/1993 | Denis et al. |
| 5,262,116 A | | 11/1993 | Von Holdt, Sr. |
| 5,277,574 A | | 1/1994 | Denis et al. |
| 5,284,432 A | | 2/1994 | Wurzer |
| 5,288,222 A | | 2/1994 | Wieser |
| 5,295,804 A | | 3/1994 | Dinnan |
| 5,308,233 A | | 5/1994 | Denis et al. |
| 5,322,651 A | | 6/1994 | Emmer |
| 5,326,250 A | | 7/1994 | Doudement ................. 425/541 |
| 5,332,384 A | | 7/1994 | Abramat |
| 5,334,007 A | | 8/1994 | Denis et al. |
| 5,338,181 A | | 8/1994 | Denis et al. |
| 5,342,558 A | | 8/1994 | Denis et al. |
| 5,346,386 A | | 9/1994 | Albrecht et al. |
| 5,350,289 A | | 9/1994 | Martin |
| 5,358,396 A | | 10/1994 | Antonious Giesen |
| 5,382,157 A | | 1/1995 | Denis et al. |
| 5,411,698 A | | 5/1995 | Mero et al. |
| 5,413,472 A | | 5/1995 | Dietterich et al. |
| 5,439,368 A | | 8/1995 | Martin |
| 5,551,860 A | | 9/1996 | Budzynski et al. |
| 5,551,861 A | | 9/1996 | Baldi |
| 5,556,648 A | | 9/1996 | Budzynski et al. |
| 5,683,729 A | | 11/1997 | Valles ........................ 425/526 |
| 5,750,161 A | | 5/1998 | Schock, Jr. et al. |
| 5,785,921 A | | 7/1998 | Outreman et al. |
| 5,968,560 A | | 10/1999 | Briere et al. |
| 6,113,377 A | | 9/2000 | Clark |

FOREIGN PATENT DOCUMENTS

| | | | | |
|---|---|---|---|---|
| DE | | 2545132 | | 4/1977 |
| DE | | 2545134 | | 4/1977 |
| DE | | 2550727 | | 5/1977 |
| DE | | 3613543 C1 | | 12/1986 |
| DE | | 3743809 | | 1/1989 |
| DE | | 3934495 C1 | | 12/1990 |
| EP | | 256777 | | 2/1988 |
| EP | | 565917 A1 | * | 10/1993 |
| FR | | 2057196 A | | 5/1971 |
| FR | | 2613979 A1 | | 10/1988 |
| FR | | 2646802 A1 | | 11/1990 |
| FR | | 2653058 A1 | | 4/1991 |
| FR | | 2659265 A1 | | 9/1991 |
| GB | | 1456833 | | 11/1976 |
| GB | | 1526492 | | 9/1978 |
| GB | | 1546234 | | 5/1979 |
| GB | | 2009029 | | 6/1979 |
| GB | | 1577034 | | 10/1980 |
| JP | | 58-36418 A | | 3/1983 |
| JP | | 1-60725 | | 4/1989 |
| JP | | 4-137827 | | 12/1992 |
| JP | | 5-169522 A | * | 7/1993 |
| WO | | WO 94/03320 | | 2/1994 |
| WO | | WO-96/33059 A1 | * | 10/1996 |

OTHER PUBLICATIONS

Wentworth Drawings Set 1, No date.
Wentworth Drawings Set 2, No date.
Wentworth Drawings Set 3, No date.
Wentworth Drawings Set 4, No date.
Wentworth Drawings Set 5, No date.
Wentworth Drawings Set 6, No date.
Wentworth Drawings Set 7, No date.
Wentworth Drawings Set 8, No date.
Wentworth Drawings Set 9, No date.
Wentworth Drawings Set 10, No date.
Wentworth Drawings Set 11, No date.
Wentworth Drawings Set 12, No date.
Wentworth Drawings Set 13, No date.
Wentworth Drawings Set 14, No date.
Wentworth Drawings Set 15, No date.
Wentworth Drawings Set 16, No date.
Wentworth Drawings Set 17, No date.
Wentworth Drawings Set 18, No date.
Wentworth Drawings Set 19, No date.
Wentworth Drawings Set 20, No date.
Wentworth Drawings Set 21, No date.
Wentworth Drawings Set 22, No date.
Wentworth Drawings Set 23, No date.
Wentworth Drawings Set 24, No date.
Wentworth Drawings Set 25, No date.
Wentworth Drawings Set 26, No date.
Wentworth Drawings Set 27, No date.
Wentworth Drawings Set 28, No date.
Wentworth Drawings Set 29, No date.
Wentworth Drawings Set 30, No date.
Wentworth Drawings Set 31, No date.
Wentworth Drawings Set 32, No date.
Wentworth Drawings Set 33, No date.
Wentworth Drawings Set 34, No date.
Wentworth Drawings Set 35, No date.
Wentworth Drawings Set 36, No date.
Wentworth Drawings Set 37, No date.
Wentworth Drawings Set 38, No date.
Wentworth Drawings Set 39, No date.
Wentworth Drawings Set 40, No date.
Wentworth Drawings Set 41, No date.
Wentworth Drawings Set 42, No date.
Wentworth Drawings Set 43, No date.
Wentworth Drawings Set 44, No date.
Wentworth Drawings Set 45, No date.
Wentworth Drawings Set 46, No date.
Wentworth Drawings Set 47, No date.
Wentworth Drawings Set 48, No date.
Wentworth Drawings Set 49, No date.
Wentworth Drawings Set 50, No date.
Wentworth Drawings Set 51, No date.
Wentworth Drawings Set 52, No date.
Wentworth Drawings Set 53, No date.

Wentworth Drawings Set 54, No date.
Wentworth Drawings Set 55, No date.
Wentworth Drawings Set 56, No date.
Wentworth Drawings Set 57, No date.
Wentworth Drawings Set 58, No date.
Wentworth Drawings Set 59, No date.
Wentworth Drawings Set 60, No date.
Wentworth Drawings Set 61, No date.
Wentworth Drawings Set 62, No date.
Wentworth Drawings Set 63, No date.
Wentworth Drawings Set 64, No date.
Wentworth Drawings Set 65, No date.
Wentworth Drawings Set 66, No date.
Wentworth Drawings Set 67, No date.
Wentworth Drawings Set 68, No date.
Wentworth Drawings Set 69, No date.
Wentworth Drawings Set 70, No date.

* cited by examiner

FIG. 6

BLOW MOLD SHELL AND SHELL HOLDER ASSEMBLY FOR BLOW-MOLDING MACHINE

CROSS-REFERENCE TO RELATED APPLICATION

"This application claims the benefit of previously filed U.S. Provisional Patent Application No. 60/099,998 entitled "Improved Blow Mold Machine Mold Shell and Shell Holder Assembly for Blow-Mold Machine" filed Sep. 11, 1998, in the name of inventor Petre."

FIELD OF THE INVENTION

The invention relates in general to stretch blow mold machinery. More particularly, the invention relates to an improved stretch blow mold shell, and a shell holder assembly therefor in which the shell holder is constructed and arranged to be mounted to one of a pair of pivoting clamp brackets used to pivotably close an opposed pair of the mold shells on themselves for use in defining a bottle cavity during usage thereof on a stretch blow mold machine.

BACKGROUND OF THE INVENTION

The use of stretch blow mold machinery is well known. Stretch blow mold machines offer the advantage of quickly and economically producing a wide variety of bottle shapes and sizes commonly used throughout a great number of consumer markets. These include longneck beverage bottles, wide mouth bottles, as well as a wide variety of soft drink and juice bottles, for example, ranging in size from approximately half liter up to 5 liters.

The use of rotating stretch blow mold machines constructed to have a rotating central frame member, or carousel, which rotates about a fixed or stationary central frame member is well known. A plurality of radially spaced bottle forming stations are typically stationed along the circumference of the carousel, each bottle forming station comprising a pair of opposed and pivotably affixed clamp brackets constructed to move from an open into a closed position, and back, in timed relationship with the rotation of the framework during machine operation.

In the known machines, a pair of shell holders, which may be identical or may differ from one another, but which, however, are substantially uniform in size and shape with respect to one another will be separately received within each respective one of the clamp brackets pivotably affixed to the blow mold machine carousel. These shell holders are fastened to the clamp brackets by a plurality of threaded fasteners, and may also be provided with cooling channels defined therein so that cooling water may be passed therethrough in the effort to regulate the interior surface temperature of a separate one of the blow mold shells fastened thereto and carried thereon, and which are used to define the bottle forming cavity which will form the bottle, or other object, during usage of the machine.

Each blow mold station thus also includes a pair of blow mold shell halves. These blow mold shell halves are typically identical, such that a symmetrical bottle, or other article, will be formed during the stretch blow mold process. Each mold shell is fastened to a respective one of the shell holders such that the completed bottle forming station will have a pair of opposed clamp brackets which are pivotably affixed to one another, much in the fashion as disclosed in U.S. Pat. No. 5,326,250 entitled "Opening and Closing Mechanism for Portfolio Blowing and Blowing Stretching Mold" issued Jul. 5, 1994 in the name of inventor Doudement, and as well as in U.S. Pat. No. 5,683,729 entitled "Apparatus for Making Containers by Blow Moulding Plastic Parisons" issued to Nov. 11, 1997 in the name of inventor Valles; a shell holder fastened to each respective clamp bracket; and in turn a mold shell half affixed to the shell holder by suitable means. Common methods of attaching these shell halves to the shell holders include the use of predefined cavities formed within the shell holder within which the shell is placed and then held in position by a keeper plate or plates fastened to the shell holder, or by passing fasteners directly through the shell and into the shell holder.

Current rotating stretch blow mold machines are capable of producing up to 50,000 articles per hour, based on the size of the articles being produced, for example half liter bottles as opposed to five liter bottles. However, an advantageous feature of certain stretch blow mold machines, and particularly those manufactured by Sidel, S.A. of Le Havre, France, and its U.S. subsidiary Sidel, Inc., is that through the use of a modular design, for example modular mold shell halves, and modular shell holders, it is possible to use one rotating blow mold machine in conjunction with several sets of shell holders, and mold shells, to produce a wide variety of bottles, for example, using only one machine. This greatly reduces machine costs, and increases operating efficiencies for stretch blow mold bottle producers. However, the change-over from molding bottles of one size to bottles of another size can be quite time consuming due to the amount of time required to remove and replace the shell holders from each pair of clamp brackets about the periphery of the machine, as well as removing and replacing the shells from the respective shell holders.

Another disadvantage of the known types of blow mold shells and shell holders is the manner in which the blow mold shell is cooled during the bottle formation process. As known to those of skill in the art, when using a PET (polyethylene terephthalate) preform, also known as a parison, it is desirable to maintain the temperature of the neck and/or threaded neck portion of the bottle at a cooler temperature than the remaining portion of the preform during the stretch blow mold process such that a sufficient amount of structural strength and rigidity is provided at the neck so that it may be used to safely convey the bottle along a packaging line, for example, whereupon the bottle is filled and then sealed/capped, and carried at its neck for being packaged and shipped. Thus, it is desirable to maintain a thicker wall section at the neck portion of the bottle, as well as at the base portion, for the purposes of lending structural rigidity to the bottle.

A cooling circuit, therefore, may be integrally defined within the neck or upper portion of the shell halves to cool the neck portion of the PET container as it is being formed, and which may also be used to cool the sidewall portion of the shell, although there is only one cooling circuit in these known constructions. The wall section of the bottle, on the other hand, which extends between the neck and base, will typically be molded in a thinner section between the neck and base in that as the bottle is empty the sidewall does not need to have a great deal of strength. Once the bottle is formed, all that is required is a sufficient amount of strength along the sidewall of the bottle to ensure that the bottle does not collapse while being handled, nor rupture once it is filled with the appropriate fluid. As known to those in the art, once the fluid is constrained within the bottle, the fluid itself acts as a constrained load carrying column which will support its own weight, so long as sufficient sidewall strength exists within the container sidewall to ensure it will not rupture.

Thus, it is desirable to mold bottles and other articles with as thin a wall section as possible, as the cost of the plastic PET material is the largest part of the expense in making bottles in the stretch blow mold process. As it is desirable to reduce the per unit costs of each bottle produced, it is desirable to precisely and separately control the temperature of the sidewall of the preform/shell as the bottle is formed to be able to provide the minimal amount of PET material required to form the bottle by keeping the sidewall warmer/hotter than the neck or base portions, for example.

In order to attempt to control the temperature of the sidewall portion of the shell/bottle, a cooling channel is drilled or otherwise defined within the shell holder, which channel will extend in the lengthwise direction of the holder and be positioned as closely as possible to the sidewall of the mold shell in order to try to cool the interior surface of the mold shell during the stretch blow mold process. Although this type of construction has proven to be adequate for high volume strength blow mold bottle production, the problem persists that a thicker wall section is formed because of the inability to separately control the temperature of the sidewall portion of the mold shell with respect to the neck portion thereof, which thus unnecessarily drives up per unit costs.

Another problem with the known types of blow mold shells and shell holders as used with rotating blow mold machines relates to the mass of the shell holder when situated in the clamp brackets, all of this being carried along the circumference of a rotating device, such that the inertial effect of this weight must be dealt with, and overcome, in order to get this mass moving before and during the bottle forming process at the desired operating speed. Due to the high speed with which rotating blow mold machines operate, it is desirable, therefore, to reduce the mass of the shell holder as well as reducing the mass of the shell in order to reduce this inertial affect, and to allow for still greater operating speeds, and which will also increase machine service life by reducing the jarring of the machine from this inertia/mass problem.

Lastly, once the size of the mold shell and the shell holders has been reduced, for the reasons described above, the problem of mold shell "compensation" arises. In the known constructions of blow mold shells and shell holders, an air injection circuit is used to inject air into the PET preform during the stretch blow mold process. This creates an internal air pressure within the shell that tends to separate the shells from one another as the bottle is being formed, the bottle acting as a large catheter or balloon that seeks to move the shells apart from one another. To combat this, an equal amount of air pressure has been introduced into the known types of shell holders and against the clamp brackets to equalize or "compensate" for this air pressure such that the mold shells will stay closed for forming a bottle without an unsightly or undesired sidewall seam along the length thereof This has been done with a common air circuit providing air to the bottle forming cavity, and the compensation area. However, this has typically required a 1:1 equalization of the air pressure/surface area of the shell holder/clamp bracket compensation area and the bottle forming cavity surface area within the shells in order to compensate accordingly. However, when reducing the size of the shells, as is done in the invention disclosed herein, a sufficient amount of surface area is not available to provide 1:1 surface/air pressure equalization between the shell holder and shell.

Therefore, a need exists for an improved blow mold shell, shell holder, and clamping bracket assembly which is constructed and arranged to allow for the quick change-over of the shells and shell holders such that machine downtime during change-over is minimized; which allows for separate internal cooling of the sidewall of the shell, directly, without having to first go through a shell holder; which reduces the mass of the shell holder and shell arrangement to offer greater machine operating speeds; and which will allow for pressure compensation of the shell/shell holder/clamp bracket during the blow mold injection process such that the mold shell halves remain closed on one another during the bottle molding process.

SUMMARY OF THE INVENTION

Accordingly the present invention provides for a blow mold assembly that benefits from increased productivity and decreases in material costs. By providing for a blow mold shell that is capable of accurately controlling the molding temperature in the various regions of the mold cavity, wall thickness of the containers can be precisely controlled, thus, optimizing the amount of preform material used to fabricate a specific container. Additionally, by providing for a lightweight mold holder design the present invention increases overall blow-molding throughput by decreasing the time required to fabricate a specified container. The streamlined blow mold assembly of the present invention also benefits from ease in changeover of mold shells and mold holders during mold fabrication due in part to the light-weight, simplistic design. Overall, the blow mold assembly of the present invention provides for an efficient and cost-saving means for manufacturing blow-molded containers.

In one embodiment of the invention the blow mold assembly that is used to manufacture blow molded containers comprises a blow mold shell, a mold holder and a mold holding assembly. The blow mold shell has a first annular groove disposed within the lengthwise exterior surface of the shell. The first annular groove serves as a mating surface for a support key that interlocks the mold shell within the blow mold assembly. The unique placement of the annular groove, proximate to the end of the blow mold shell nearest the neck portion of the shell's cavity allows for two or more independent cooling channels to exist within the mold shell. By providing for a first cooling channel capable of cooling the sidewall portion of the molded container and a second cooling channel capable of independently cooling the neck portion of the molded container, wall thickness can be optimized in specified areas of the container to minimize the amount of material required to fabricate a structurally sound container. Alternatively, the second cooling channel or an additional cooling channel may be located within a separate shoulder insert placed within the interior surface of the blow mold proximate the neck portion of the mold.

Additionally, the blow mold assembly comprises a mold holder that includes arcuate interior surfaces and arcuate exterior surfaces so as to create a concentric blow mold holder. This construct of a blow mold holder benefits from less mass, thereby significantly increasing production rates and overall ease during time consuming changeover periods for mold shells and shell holders. The mold holder may comprise a pressure compensation element that is capable of compensating for the pressure build-up within the mold shell during the blow mold process.

The blow mold assembly also comprises a blow molding holding assembly that comprises clamping brackets having arcuate inner surfaces for mating with the arcuate exterior surfaces of the mold holder or mold shell. The clamping brackets are pivotally driven by a cam apparatus within a blow-molding machine and serve to open and close the blow mold assembly as warranted by the fabrication process. The quick release nature of the clamping brackets allow for mold shells to be removed and inserted with greater ease during the fabrication process thus, increasing the efficiency of the overall blow mold assembly.

In another embodiment of the invention the blow mold shell assembly comprises a mold shell and a mold holding assembly. This assembly is consistent with the above-discussed assembly except for the omission of the mold holder. While most mold shell assemblies will implement a mold holder for ease in mold shell changeout, it is possible to construct the blow mold assembly of the present invention without the need to include a mold holder. In such a relationship, the mold holding assembly comprises clamping brackets having an arcuate inner surface and the arcuate inner surface of the clamping brackets are disposed circumferentially about the exterior surface of the blow mold shell.

In other embodiments of the invention the individual blow mold shell, shell holder and blow mold holding assembly are defined per the previous discussion.

As such, the blow mold assemblies that have these improved performance characteristics, and many others that will be readily apparent to those of ordinary skill in the art, are desired for improving the overall cost efficiency and production throughput of blow mold manufactured containers.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1A:
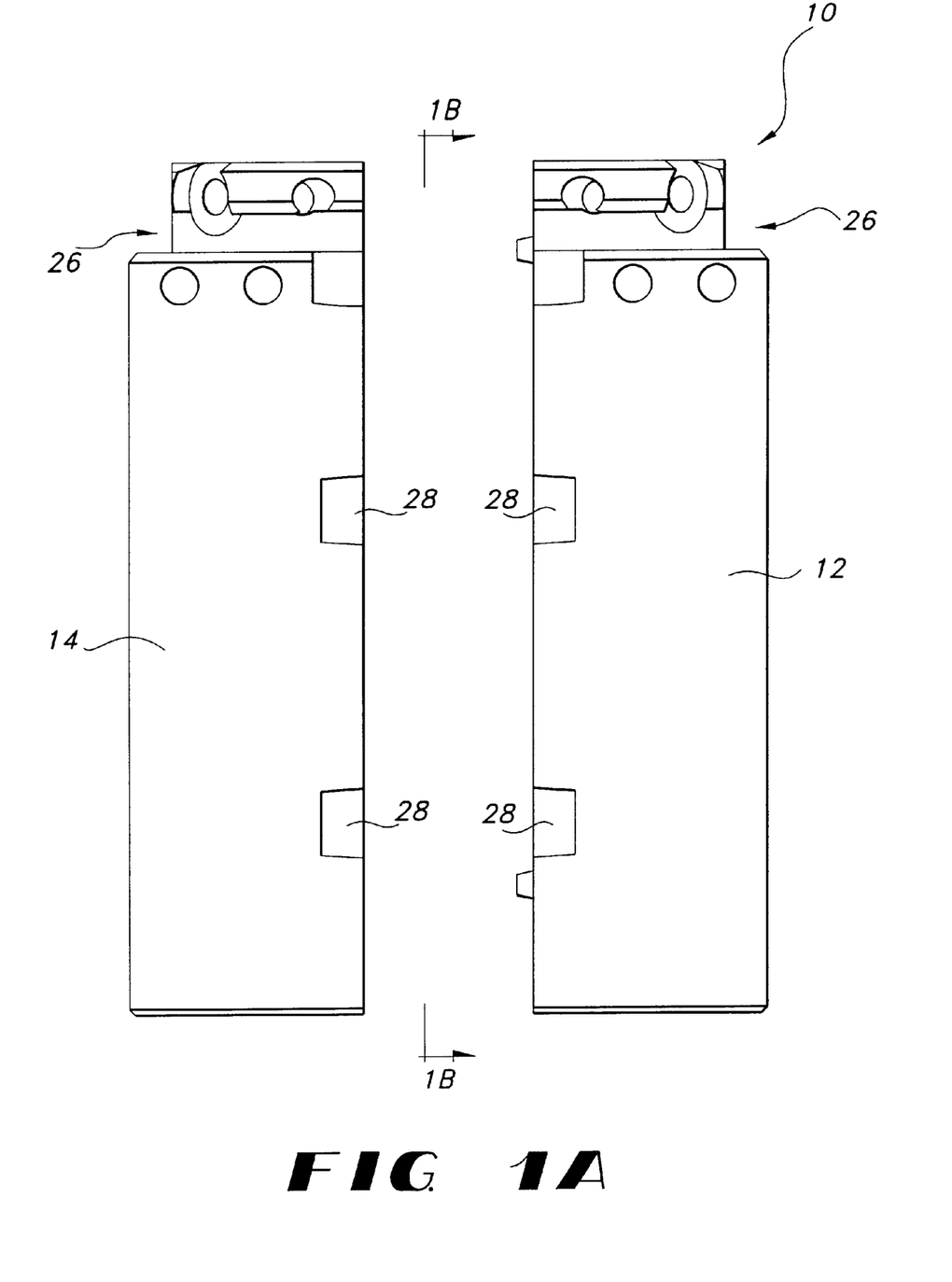
FIG. 1A illustrates a side view of two blow mold shell halves in accordance with an embodiment of the present invention.
Figure 1B:
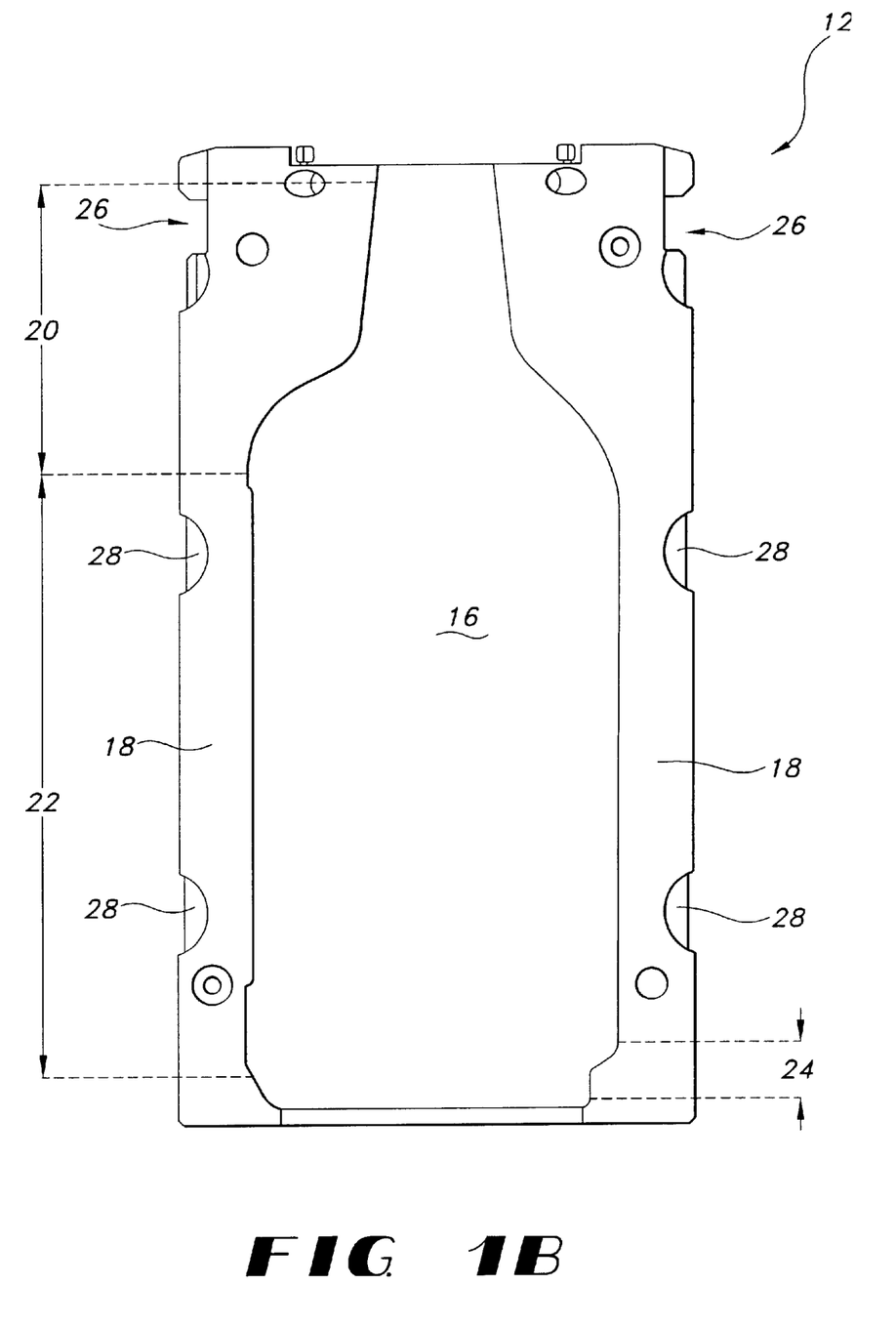
FIG. 1B illustrates a side view of a blow mold shell half depicting the inner cavity of the mold in accordance with an embodiment of the present invention.

FIGS. 1A–1E are various views of a blow mold shell in accordance with one embodiment of the present invention. FIG. 1A is side view of the blow mold shell 10 comprising a first mold shell half 12 and a second mold shell half 14 that generally have cavities defined within that are mirror images of one another whereupon mating the two halves together defines the shape of the molded structure. FIG. 1B is a side view of the first mold shell half including the cavity region 16 and the mating surface 18. The mold structure will typically comprise a top or neck portion 20, an elongated sidewall portion 22 and a bottom portion 24. The mold portions are defined and predetermined in accordance with the desired resulting blow mold structure. Typically, the mold shell is machined from a metallic material, such as aluminum or steel. At the neck portion of the mold shell, a single annular groove 26 is defined within the lengthwise exterior surface of the mold shell. The single annular groove is positioned so as to receive a single support ring or semi-circular key from the improved mold holding assembly of the present invention. Further detailed discussion of the mold holding assembly (shown in FIG. 5) appears below. Tab indentations 28 are defined in the mating surface and serve to receive tabs from a mating shell holder.

Figure 1C:
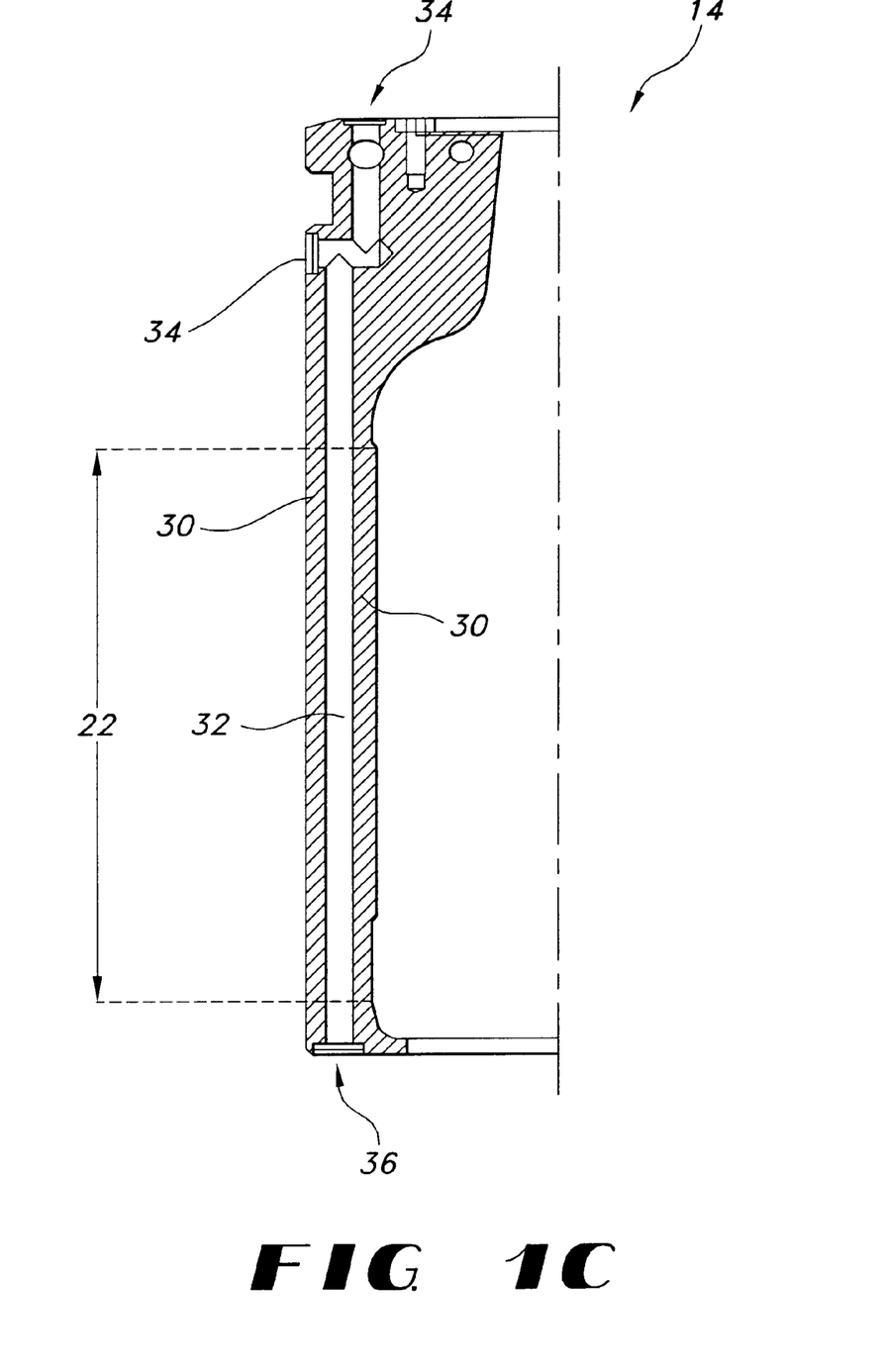
FIG. 1C illustrates a cross sectional view of a blow mold shell half depicting a first cooling channel in accordance with an embodiment of the present invention.

FIG. 1C illustrates a cross sectional view of the second mold shell half 14 having defined within the lengthwise wall 30 a first cooling channel 32. The first cooling channel is typically machined into the mold shell during the fabrication of the mold shell. It should be noted that more that one cooling channel may exist within the lengthwise wall. Various configurations of the cooling channels can be implement to accomplish the desired cooling temperature within the molded structure. The first cooling channel is provided for the purpose of cooling the sidewall portion 22 of the molded structure independently from the cooling of the neck portion during the blow mold bottle formation process. In operation, a cooling fluid, typically water, enters the sidewall cooling channel through input ports 34 in the mold shell, flows through the channel during the blow molding process and exits the mold shell through an output port 36. Alternately, the input and output ports may be reversed to accommodate fluid flow in the opposite direction.

Figure 1D:
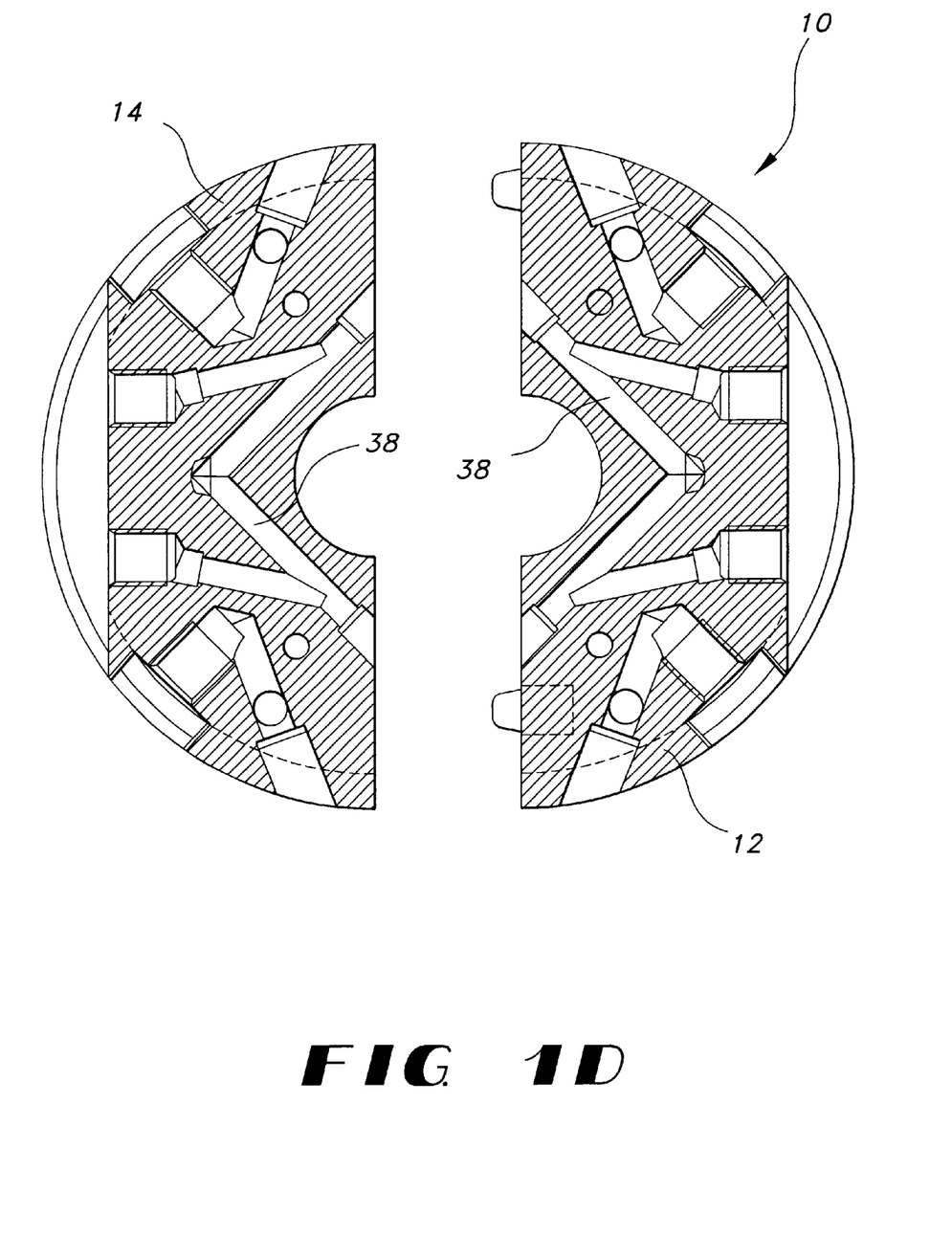
FIG. 1D illustrates a cross sectional view of a blow mold shell depicting a second inner cooling channel in accordance with an embodiment of the present invention.

FIG. 1D illustrates a cross sectional view of the mold shell halves 12, 14 of the overall mold shell 10 having defined within the neck portion of the wall a second cooling channel 38. One or more separate cooling channel(s) may be disposed within the neck portion of the mold shell. The neck portion cooling channel(s) are typically machined into the mold shell during the fabrication of the mold shell. Various configurations of the neck portion cooling channel(s) can be implement to accomplish the desired cooling temperature within the neck portion of the molded structure. By providing independent cooling channels in the mold shell it is possible to more readily control the temperature of the mold portions during the blow mold process. Thus, the first cooling channel is able to maintain a higher temperature near the sidewall portion, resulting in thinner sidewalls in the molded structure, while the second cooling channel is capable of maintaining a lower temperature near the neck portion, resulting in a more rigid, "thicker" neck portion in the molded structure. Further discussion of the configuration of multiple cooling channels is omitted from this discussion as to not overcomplicate the disclosure. For a more in-depth discussion on multiple cooling channel configurations see U.S. patent application Ser. No. 09/304,903 entitled "Blow Mold Shell and Shell Assembly" filed on May 4, 1999 in the name of inventor Petre and assigned to Sidel Inc., the assignee of the present invention. That application is herein incorporated by reference as if set forth fully herein.

Figure 1E:
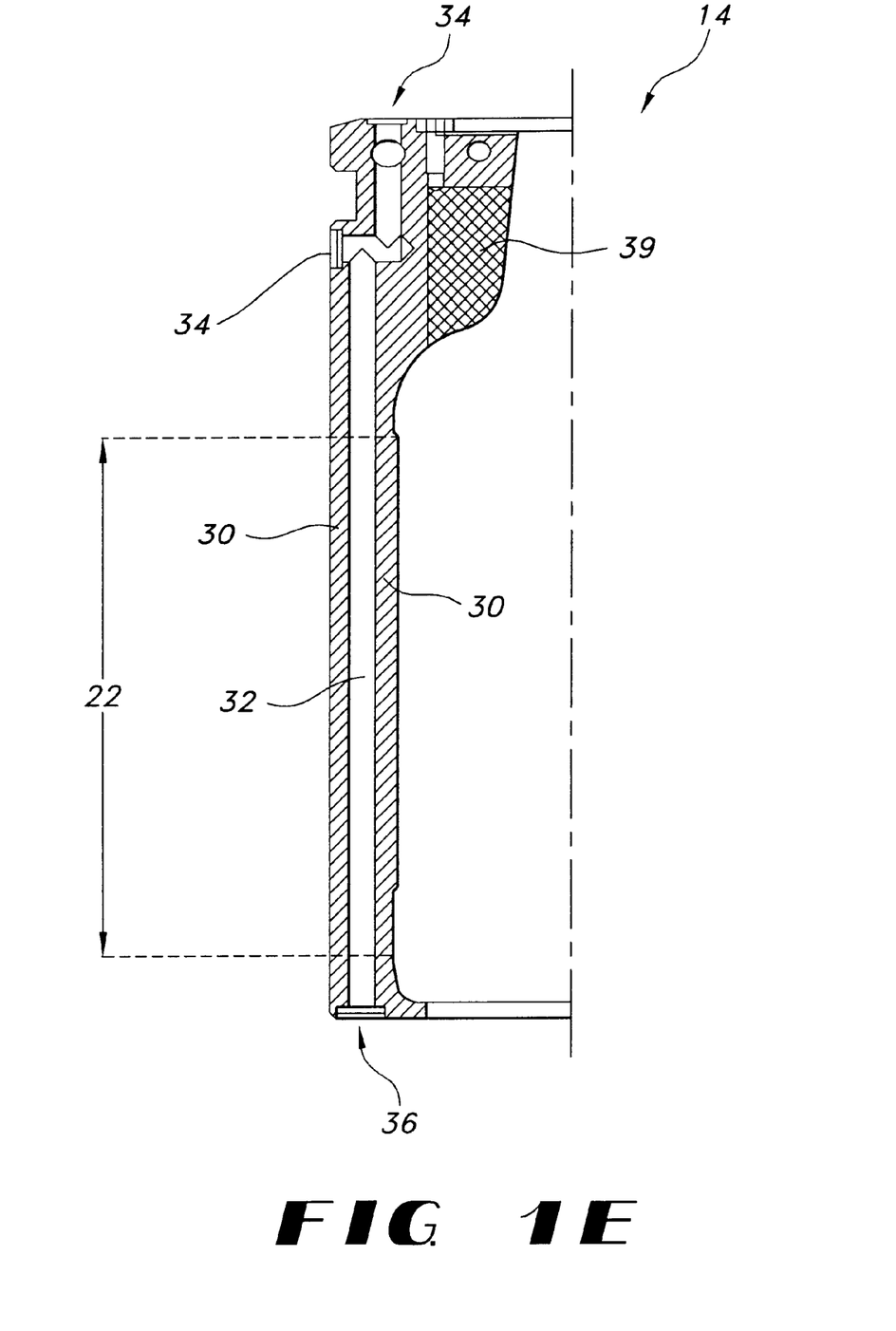
FIG. 1E illustrates a cross sectional view of a blow mold shell half depicting a shoulder insert in accordance with an embodiment of the present invention.

Additionally, the blow mold shell may incorporate the use of a separate shoulder insert that may incorporate independent cooling channels. Shown in the mold shell half 14 of FIG. 1E is an example of a shoulder insert 39 placed within the interior surface of the mold shell. As depicted, the shoulder insert mates with and is affixed to the interior surface of the mold shell, forming a portion of the composite mold. The shoulder insert may comprise one or more independent cooling channels (not shown in FIG. 1E) or the shoulder insert may provide cooling channels that connect with cooling channels existing in the blow mold shell. The separateness of the shoulder insert allows for the cooling channels to more accurately isolate temperatures within the shoulder insert and the blow mold. This, in turn, allows for more precise control of the temperature within the neck portion of the mold. By precisely controlling the temperature within the various regions of the mold the molded containers benefit from improved quality and cost efficient containers. For example, overall container wall thickness is structurally minimized, container warpage is controlled and consistent polymer crystallization occurs. The shape and location of the shoulder insert is shown in FIG. 1E by way of example. It is possible and within the inventive concepts herein disclosed to position the shoulder insert in various other locations within the mold shell and to configure the shoulder insert in various other shapes. The location and shape of the shoulder insert may be dictated by many factors, including, the degree of temperature control desired, the shape of the desired molded container and the ease in fabricating the insert.

Figure 2A:
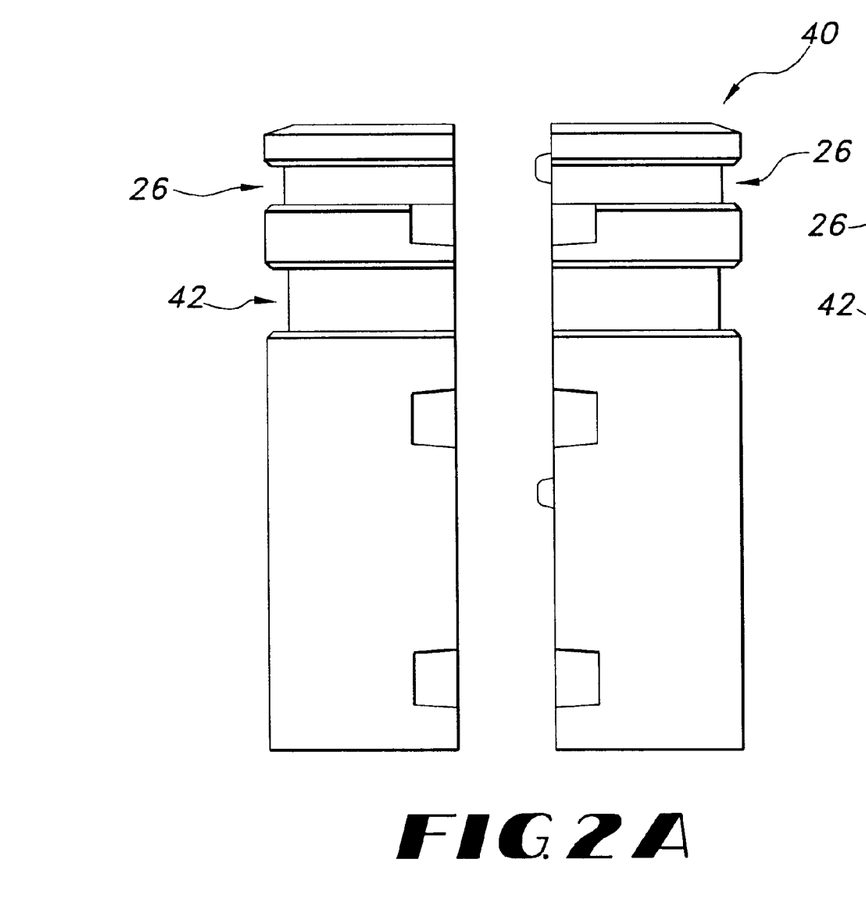
FIG. 2A illustrates a side view of a modified blow mold shell having two annular grooves in accordance with an embodiment of the present invention.
Figure 2B:
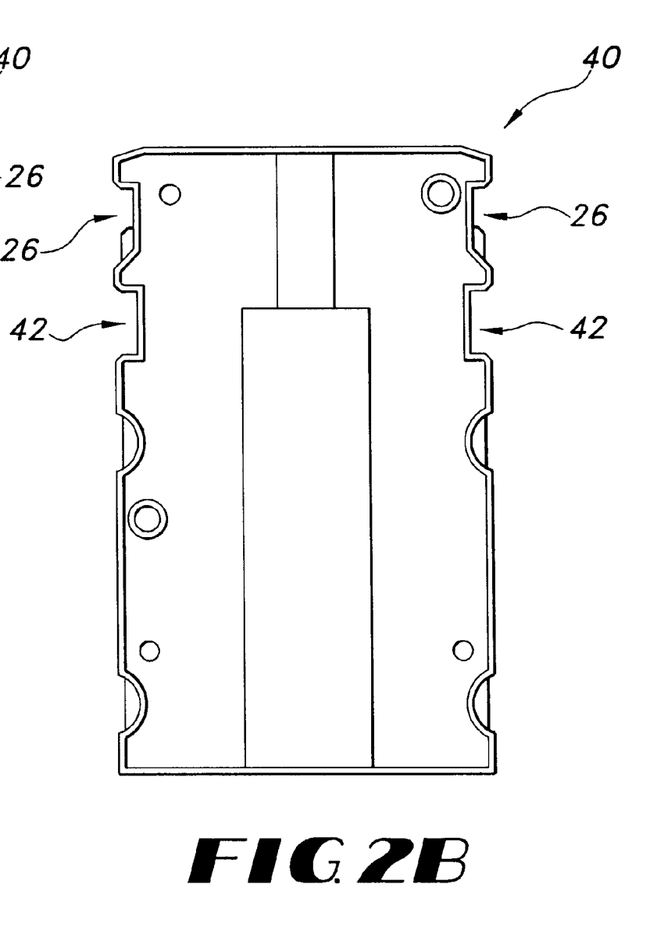
FIG. 2B illustrates a cross sectional view of a modified blow mold shell having two annular grooves in accordance with an embodiment of the present invention.

The cooling channel scheme of the present invention is contrasted with the modified mold shell shown in FIGS. 2A–2B. The modified mold shell of FIGS. 2A–2B is in accordance with another embodiment of the present invention. In this mold shell 40 a lower or second annular groove 42 is defined within the lengthwise exterior surface of the mold shell. The second annular groove is positioned so as to receive a lower positioned support ring or key from prior art mold holding assemblies. Prior art mold holding assemblies dictate that the annular groove be located farther down the lengthwise exterior surface of the blow mold than the first annular groove shown in the FIG. 1 embodiment.

Additionally, FIG. 2A and 2B have a first annular groove machined in the lengthwise exterior surface of the mold shell, so that mold shell 40 can accommodate both the improved mold holding assemblies of the present invention and the prior art mold holding assemblies. The second annular groove limits the capability of blow mold 40 from having two or more independent cooling channels. The mold shell wall section adjacent to the second annular groove may become too thin to allow a second cooling channel to exist therein while still providing sufficient structural rigidity within the mold shell. Thus, mold shells having a second annular groove located farther down the lengthwise external surface of the mold shell or having one annular groove that is located farther down the lengthwise external surface of the blow mold than the first annular groove of FIG. 1. are typically limited to a single cooling channel.

Although not shown in FIGS. 1 and 2, it is anticipated that as the mold shell halves are mated to one another, as shown in FIG. 1A, that a base mold, typically having a pedaloid or "crown" shape, will be positioned between the mold shell halves. The mold shell halves and the base mold are held in place during blow mold processing by use of a mold holding assembly. The mold holding assembly will typically comprise a shell holder and a clamping mechanism or, in some instances, a clamping mechanism only. Once the shell halves and the base mold are held in place they define a structure cavity that outlines the boundaries of the structure to be blow molded. As known by those of ordinary skill in the art, the base mold may be provided with one or more separate cooling channels. As previously discussed, it is desirable to maintain a thicker wall section in the base of the molded structure as compared to the sidewall thickness and therefore it is desirable to maintain lower molding temperatures at the base compared to the sidewalls. The use of a separate cooling channel within the base mold will allow for a lower molding temperature to be maintained in the base portion and result in thicker walls in the base of the structure.

Figures 3A, 3B, 3C:
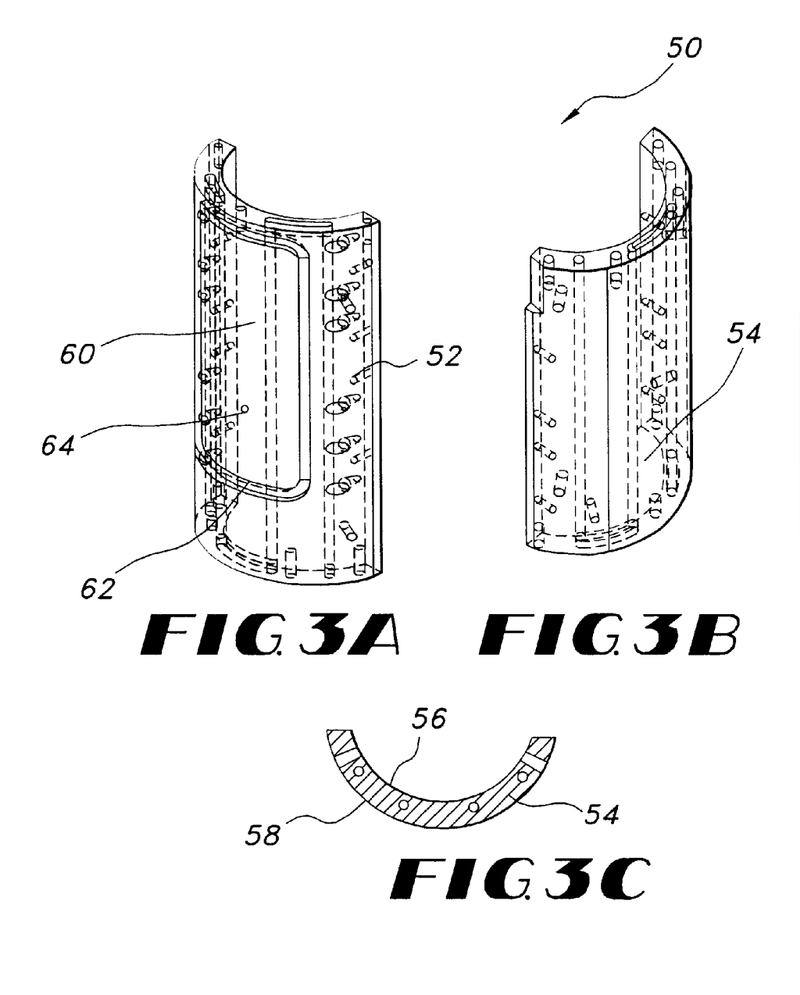
FIG. 3A illustrates a perspective view of a first shell holder half having a pressure compensation element in accordance with an embodiment of the present invention.
FIG. 3B illustrates a perspective view of a second shell holder half in accordance with an embodiment of the present invention.
FIG. 3C illustrates a cross sectional view of the arcuate shell holder in accordance with an embodiment of the present invention.
Figure 3D:
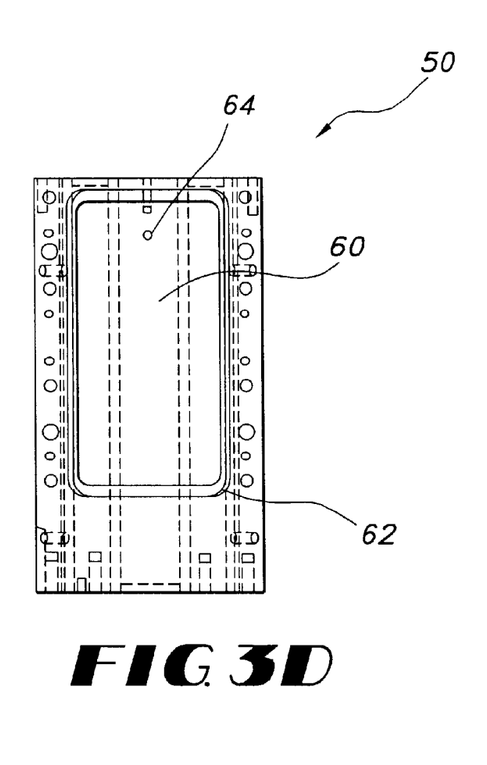
FIG. 3D illustrates a side view of a first shell holder half having a pressure compensation element in accordance with an embodiment of the present invention.

In accordance with one embodiment of the present invention, FIG. 3A–3D depict various views of an improved blow mold shell holder 50. FIG. 3A and 3B are perspective views of a first half 52 and a second half 54 of shell holder 50. This shell holder is intended for use with the single annular grooved blow mold shell of FIG. 1, as well as the dual annular grooved blow mold shell of FIG. 2. As illustrated in FIG. 3C a cross sectional view of the first half of the shell holder, the improved shell holder halves have an arcuate inner surface 56 and an arcuate outer surface 58. The overall arcuate cross-sectional design of the shell holder allows for the shell holder halves to be mated together and extend concentrically about the blow mold shell in a fashion previously unknown in the art.

Figures 4A, 4B:
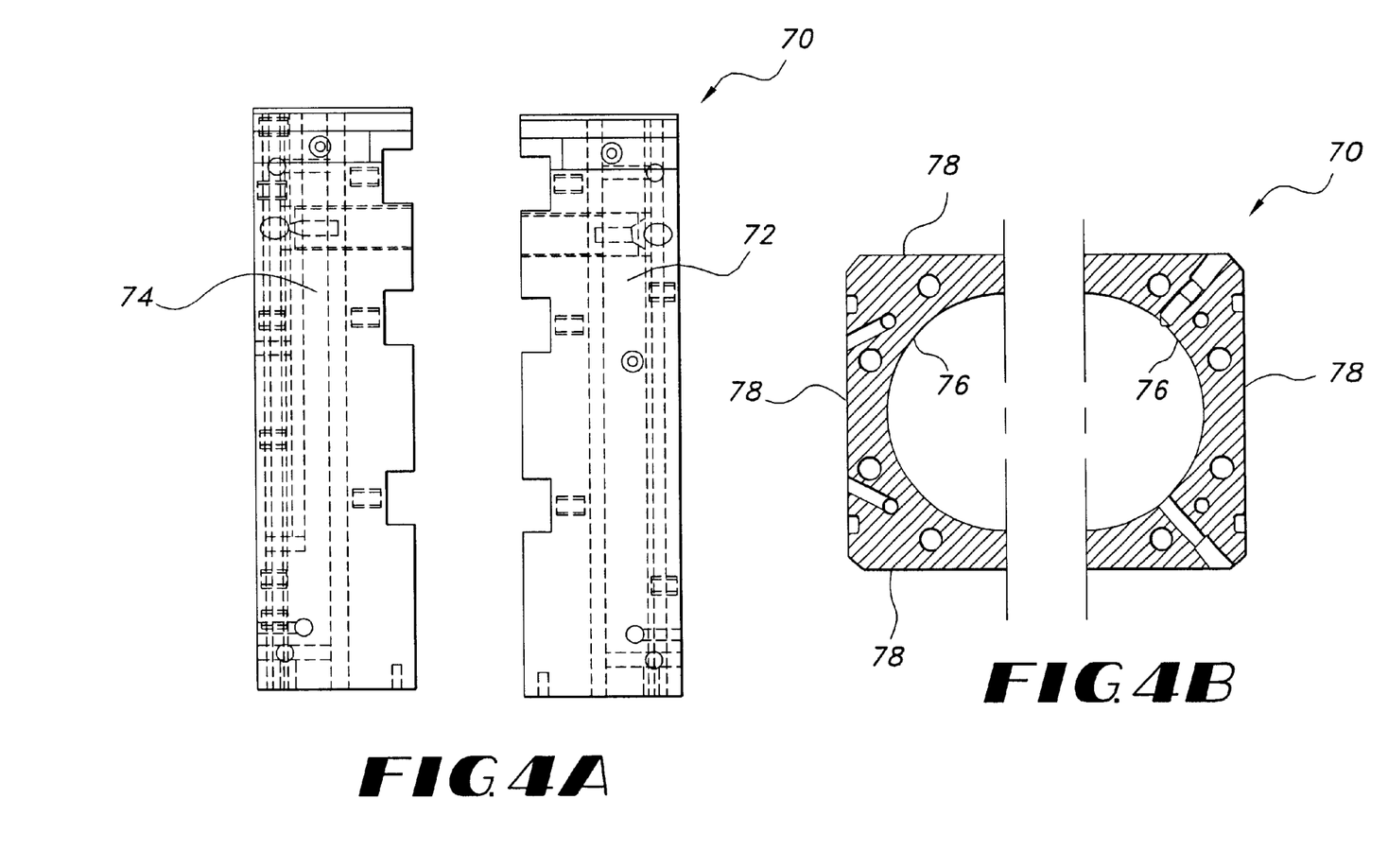
FIG. 4A illustrates a side view of two halves of a shell holder in accordance with the prior art.
FIG. 4B illustrates a cross sectional view of two halves of a rectangular shell holder in accordance with the prior art.

The advantage of this concentric construction is that a reduced mass results, which allows for increased machine operating speeds. Shown in FIGS. 4A–4B are various views of an example of a prior art shell holder 70. FIG. 4A illustrates a side view of the first half 72 and the second half 74 of the shell holder 70. In a mated form the two shell holder halves will comprise four lengthwise generally planar outer surfaces. The rectangular relationship of the outer surfaces is depicted in the cross-sectional view of the shell holder shown in FIG. 4B. The inner surfaces 76 are generally arcuate in shape and are designed to receive an appropriate mold shell, while the outer surfaces 78 are generally planar. The disadvantage of the rectangular cross-sectional shell holder is that greater mass results from the additional material at the corners of the construct. The lighter shell holder of the present invention increases production rates and provides added efficiency by being easier to handle during time consuming mold shell changeover periods. Additionally, the arcuate design of the shell holder of the present invention requires less material to fabricate, thus reducing per unit costs of the shell holder and eliminating the potential for stress-strain and/or fracture points inherent in the corners of the previous rectangular designs.

By way of example, when using the known type of blow mold shell holder shown in FIGS. 4A–4B, production rates of approximately 1,200 bottles per minute per mold shell can be realized. However, by providing the improved blow mold shell holder configuration shown in FIGS. 3A–3D, 1,400 bottles per minute per mold shell can be attained. This significant improvement in productivity results in an additional 12,000 bottles per hour produced by the same blow mold machine when using this improved blow mold shell. When used in conjunction with the improved multi cooling channel mold shell the combined entity will result in improved productivity and reduction in the per unit costs of the molded structure. The multi cooling channel mold shell allows for precise control of the bottle wall thickness. By precisely controlling the thickness of the sidewall, neck portion and base portion of the molded structure the amount of PET mold material used can be minimized, such that per unit material costs can be reduced.

Figures 5A, 5B, 5C:
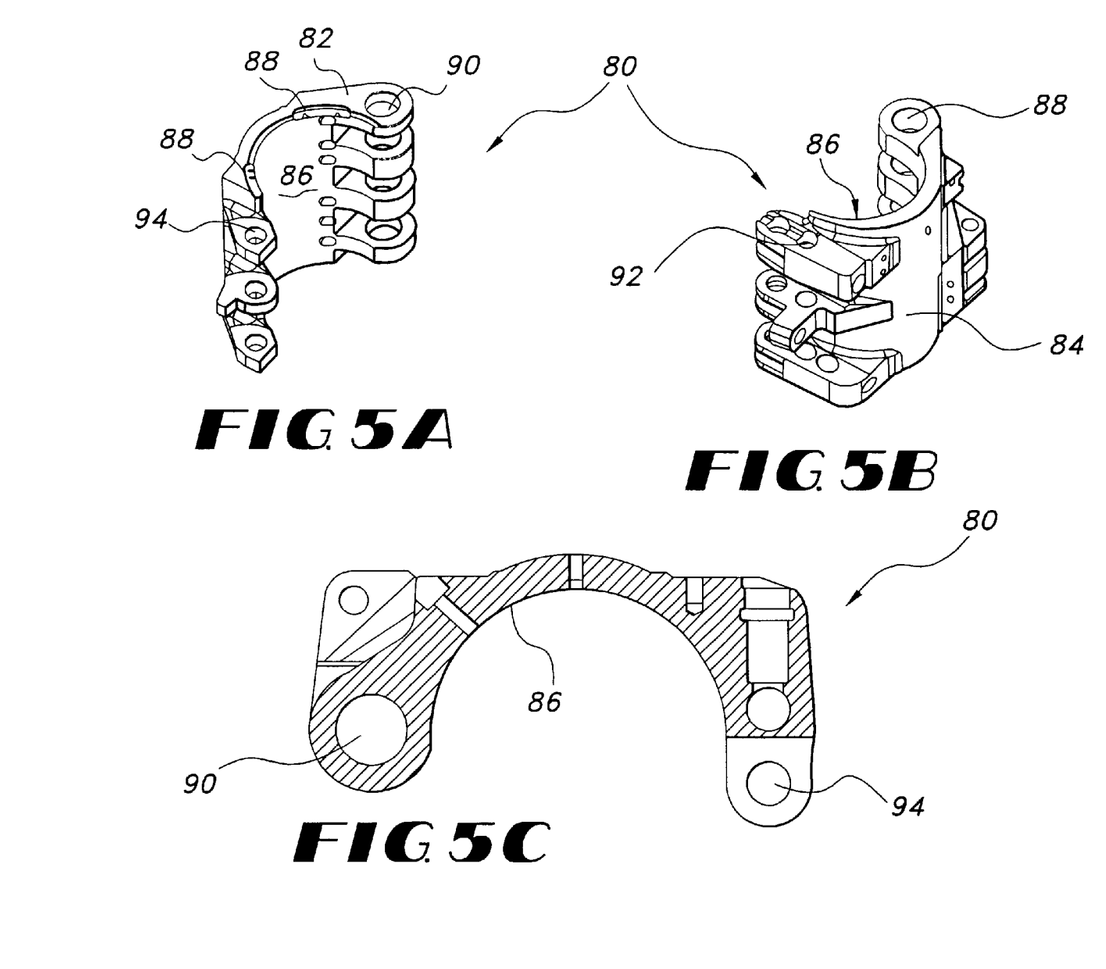
FIGS. 5A–5B illustrate two perspective views of the two halves of a clamping bracket used in the mold holding assembly in accordance with another embodiment of the present invention.
FIG. 5C illustrates a cross sectional view of a clamping bracket half in accordance with another embodiment of the present invention.

Referring now to FIGS. 5A–5C shown are various views of the clamp brackets of a mold holding assembly. FIGS. 5A and 5B are perspective views of a mold holding assembly 80 having a first clamp bracket 82 and a second clamp bracket 84. As is seen in FIGS. 5A and 5B, as well as the cross-sectional view of FIG. 5C, each clamp bracket has an arcuate inner surface 86, sized and shaped to receive a blow mold shell holder of FIGS. 3A–3D or one of the mold shells of FIGS. 1 or 2. This arcuate inner surface is formed as a generally smooth wall. The mold holding assembly is designed to hold either the mold shell directly or the combination of a mold shell and a shell holder. The use of the mold holding assembly to bracket the combination of the mold shell and shell holder is typically preferred because it allows for more ease in releasing and changing-out mold shells during production. For instance, in the embodiment using an intermediate shell holder the clamp brackets are clamped to the shell holder and thus, removal of the mold shell is relatively simplistic. Alternatively in the embodiment that does not use a shell holder, the clamp brackets are clamped directly to the mold shell, making the removal of mold shells a more time consuming process. Additionally, a semi-circular key (not shown in FIG. 5) may be inserted in the notches 88 of the clamp bracket and the key serves to support the mold shell by mating with the single annular groove of the mold shell.

The first and second clamp brackets 82, 84 are fastened together by inserting hinge pins, such as bolts (not shown in FIG. 5) through the large holes 90 once the two brackets have been mated together and the large holes are aligned. In this fastened relationship the two brackets are pivotally affixed to one another such that they can be opened and closed in a clamshell type style, as disclosed in U.S. Pat. No. 5,326,250 entitled "Opening and Closing Mechanism for Portfolio Blowing and Blowing-Stretching Mold" issued on Jul. 5, 1994 to inventor Doudement, the provisions of which are incorporated herein by this reference. The second clamp bracket provides for cam driven locking pins 92 that are mated and fastened to the small holes 94 of the first clamp bracket to form the overall circumferential mold holding assembly. A cam powered apparatus serves to lock and unlock the locking pins during blow mold processing.

"Referring back to FIGS. 3A and 3D shown are a perspective view and a side view, respectively, of the improved mold holder 40 having defined therein an outwardly facing external rectangular region 60. This rectangular region is used to form a pressure compensation element within the composite blow mold shell and mold holding assembly. The rectangular shape of the region is shown by way of example and other region shapes may also be construct as dictated by the desired pressure compensating characteristics. A continuous oaring groove 62 extends about the periphery of the rectangular region, in which a flexible o-ring (not shown in FIG. 3) is positioned. The o-ring serves to seal-off a pressure cavity between the exterior surface of the mold holder defined by the rectangular region and the adjacent clamping brackets. In this manner, an air tight compensation chamber may be defined between the external surface of the shell holder cavity and the interior surface of the clamp bracket. An air passageway 96 (shown in FIGS. 5B and 5C) or multiple air passageways may be defined within the mold holding assembly and lead into communication with the cavity. The air passageways serve to provide an inlet for pressurized or compressed air to be passed into the cavity. Thrust screws (not shown in FIGS. 3A and 3D) are placed in the counter bores 64 surrounding the rectangular region and contact the exterior surface of the mold shells. Spring-like mechanisms, such as belleville springs/washers, are affixed to the thrust screws intermediate the interior surface of the mold holder and the exterior surface of the mold shell. The overall effect of the pressurized cavity, the thrust screws and the spring-like mechanism is the creation of a short stroke piston. The blow stretch molding process entails injecting compressed or pressurized air from a first air circuit into a PET preform positioned within the cavity defined by the blow mold shell and the base mold. The pressurized air allows the preform to expand within the mold shell and define the surfaces of the molded structure as it adheres to the interior surfaces of the mold shell and the base mold. As the air pressure within the mold shell increases there exists a tendency for the mold shell halves to be forced apart and, subsequently, form a seam along the lengthwise direction of the molded structure. The pressure compensation element serves to offset the pressure built up in the mold shell cavity by activating the short stroke piston movement of the thrust screws. Hence, during the blow stretch molding process pressurized or compressed air is passed into the compensation cavity through a separate second air circuit such that it will create an equalizing pressure that compensates for the increase of air pressure within the cavity of the mold shell by activating short stroke pistons (i.e. thrust screws and spring-like mechanisms) that counter the outward movement of the mold shell. The separate second air circuit will typically be capable of providing the pressure compensation element with about 600 psi of pressurized air. As a result the pressure compensating element will keep the mold shell halves firmly mated or seated upon one another, rather than allowing the shells to be forced or otherwise spread apart by the increase in air pressure within the mold shell cavity as the stretch mold process occurs."

Figure 6:
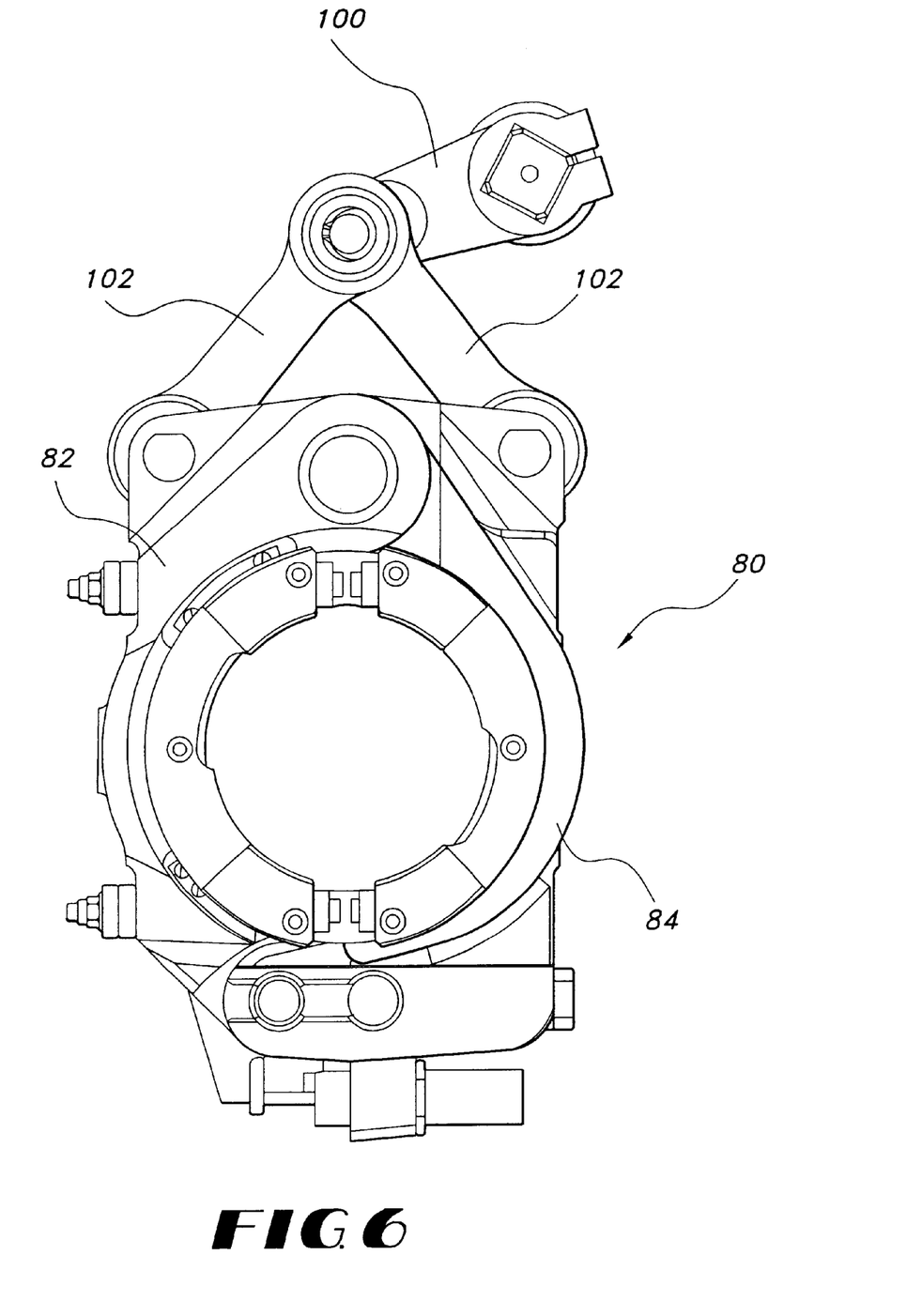
FIG. 6 illustrates a top view of a mold holding assembly used in conjunction with a carousel type blow mold machine in accordance with an embodiment of the present invention.

FIG. 6 illustrates a top view of the clamp brackets of FIGS. 5 assembled together to form a composite mold holding assembly. The mold holding assembly 80 shown in FIG. 6 is configured for use with one of the known types of rotating or carousel stretch blow mold machines. Accordingly, cam follower 100 extends from a pair of pivotable link or actuating arms 102 fastened to the clamp brackets 82, 84. The cam follower rides within a cam track so that at the appropriate position about the center stationary frame portion of the machine (not shown in FIG. 6), the clamp brackets will be opened and closed in accordance with the requisite desired action. The clamp brackets are in an open position to allow for a PET preform to be placed within the clamp bracket/shell holder/mold shell assembly. The clamp brackets are closed when a structure is being molded within the shell. Finally, the clamp brackets are opened to allow the completed structure to be removed from the shell. All of these opening and closing actions occur in a continuous process as the carousel rotates continuously.

Although the improved blow mold shell of FIGS. 1A–1D is intended for use with the improved shell holders of FIGS. 3A–3D, it is also anticipated that this type of mold shell can be used with the known blow mold shell holder of FIGS. 4A–4B, as well as the other types of known shell holders and blow mold machines. The advantage of using the shell holders of FIGS. 3A and 3D, however, lies in their reduced mass, and thus reduced inertia in operation, which allows for the increase in operating speeds, described hereinabove. Additionally the improved shell holders benefit from ease in changeover and the unique pressure compensation element. All of these factors combined result results in greater productivity and lower production costs.

The disclosed mold shells, and shell holders, thus overcome the problems described above. The mold shells are configures such that a single support (clamping) groove is defined at its upper end which allows for a first cooling channel to be defined lengthwise along the sidewall of the mold shell and a second separate cooling channel to be defined proximate the neck portion. The novel shell holder is constructed and arranged in a novel arcuate shape that results in a reduced mass and which fits within a cylindrical mold holder assembly. Additionally, a pressure compensation element is defined within the shell holders that allows for pressure build-up in the mold shell to be compensated for by applying an opposing pressure.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A blow-mold assembly for use in the manufacturing of molded containers, the blow-mold assembly comprising:
   a blow mold shell having a first annular groove disposed along the lengthwise external surface of the blow mold shell proximate a neck portion end of the blow mold shell, said blow mold shell defining at least one cooling channel configured to route cooling fluid therethrough, said cooling channel having at least one port opening;
   a blow mold holder disposed about the circumference of the lengthwise external surface of the blow mold shell, said blow mold holder having an arcuate inner surface and an arcuate outer surface; and
   a blow mold holding assembly comprising clamping brackets disposed about the arcuate outer surface of said blow mold holder, the clamping brackets having an arcuate inner surface,
   such that when said shell, said holder, and said holding assembly are assembled, said port opening is not covered by said blow mold holder or by said blow mold holding assembly.

2. The blow mold assembly of claim 1, wherein said blow mold shell further comprises two or more cooling channels, wherein the two or more cooling channels are separate and independent of one another.

3. The blow mold assembly of claim 1, wherein said blow mold shell further comprises a first cooling channel and a second cooling channel, wherein the first cooling channel is separate and independent from the second cooling channel.

4. The blow mold assembly of claim 3, wherein said first cooling channel is disposed in the interior of said blow mold proximate a sidewall portion of a mold cavity.

5. The blow mold assembly of claim 3, wherein said second cooling channel is disposed in the interior of said blow mold proximate a neck portion of a mold cavity.

6. The blow mold assembly of claim 1, wherein the first annular groove of said mold shell is disposed along the lengthwise external surface of the blow mold so as to allow for two or more independent cooling channels to exist within the blow mold.

7. The blow mold assembly of claim 1, further comprising a shoulder insert that mates with and is affixed to the interior surface of the blow mold shell.

8. The blow mold assembly of claim 7, wherein the shoulder insert is located proximate to the neck portion of the blow mold shell.

9. The blow mold assembly of claim 7, wherein the shoulder insert further comprises an independent cooling channel.

10. The blow mold assembly of claim 7, wherein the shoulder insert further comprises a cooling channel that connects with cooling channels existing in the blow mold shell.

11. The blow mold assembly of claim 1, wherein the first annular groove of said mold shell has a predetermined shape so as to mate with and receive a support structure therein.

12. The blow mold assembly of claim 1, wherein said blow mold shell further defines a second annular groove disposed along the lengthwise external surface of the blow mold shell proximate the first annular groove.

13. The blow mold assembly of claim 1, wherein said blow mold holder further defines a concentric blow mold holder.

14. The blow mold assembly of claim 1, wherein said blow mold holder further comprises a pressure compensating element that creates a pressure compensating cavity between said blow mold holder and said mold holding apparatus.

15. The blow mold assembly of claim 14, wherein said pressure compensating element further comprises an elongated cavity in the external surface of said blow mold holder, an o-ring groove surrounding the periphery of the elongated cavity, an o-ring disposed within the o-ring groove and an inlet for pressurized air disposed within the external surface of the elongated cavity.

16. The blow mold assembly of claim 1 wherein the clamping brackets of said mold holding assembly pivotally open to allow blow mold shell release.

17. The blow mold assembly of claim 1 wherein said mold holding assembly is operably connected with a cam driven carousel blow molding machine.

18. A blow mold assembly for use in the manufacturing of molded containers, the blow-mold assembly comprising:
   a blow mold shell having a first annular groove disposed along the lengthwise external surface of the blow mold shell proximate the neck portion end of the blow mold blow mold shell, said blow mold shell defining at least one cooling channel configured to route cooling fluid therethrough, said cooling channel having at least one port opening; and a blow mold holding assembly comprising clamping brackets disposed about the exterior surface of the blow mold shell, the clamping brackets having an arcuate inner surface, such that when said shell and said holding assembly are assembled, said port opening is not covered by said blow mold holding assembly.

19. The blow mold assembly of claim 18, wherein said blow mold shell further comprises two or more cooling channels, wherein the two or more cooling channels are separate and independent of one another.

20. The blow mold assembly of claim 18, wherein said blow mold shell further comprises a first cooling channel and a second cooling channel, wherein the first cooling channel is separate and independent from the second cooling channel.

21. The blow mold assembly of claim 20, wherein said first cooling channel is disposed in the interior of said blow mold proximate a sidewall portion of a mold cavity.

22. The blow mold assembly of claim 20, wherein said second cooling channel is disposed in the interior of said blow mold proximate a neck portion of a mold cavity.

23. The blow mold assembly of claim 18, further comprising a shoulder insert that mates with and is affixed to the interior surface of the blow mold shell.

24. The blow mold assembly of claim 23, wherein the shoulder insert is located proximate to the neck portion of the blow mold shell.

25. The blow mold assembly of claim 23, wherein the shoulder insert further comprises an independent cooling channel.

26. The blow mold assembly of claim 23, wherein the shoulder insert further comprises a cooling channel that connects with cooling channels existing in the blow mold shell.

27. The blow mold assembly of claim 18, wherein the first annular groove of said mold shell is disposed along the lengthwise external surface of the blow mold so as to allow for two or more independent cooling channels to exist within the blow mold.

28. The blow mold assembly of claim 18, wherein the first annular groove of said mold shell has a predetermined shape so as to mate with and receive a support structure therein.

29. The blow mold assembly of claim 18, wherein said blow mold shell further defines a second annular groove disposed along the lengthwise external surface of the blow mold shell proximate the first annular groove.

30. The blow mold assembly of claim 18 wherein the clamping brackets of said mold holding assembly pivotally open to allow blow mold shell release.

31. The blow mold assembly of claim 18 wherein said mold holding assembly is operably connected with a cam driven carousel blow molding machine.

32. A blow mold shell for use in the manufacturing of elongate molded containers having a longitudinal axis, the blow mold shell comprising:

an elongate container-defining cavity having a neck portion, a sidewall portion and a base portion;

a first annular groove disposed about the lengthwise exterior surface of the blow mold shell proximate the neck portion end of the blow mold shell;

a first cooling channel disposed within a wall of said blow mold shell, said first cooling channel having at least one port opening along the direction of said longitudinal axis; and a second cooling channel disposed within the wall of said blow mold shell, wherein the second cooling channel is separate and independent from said first cooling channel.

33. The blow mold shell of claim 32, further comprising a second annular groove disposed about the lengthwise exterior surface of the blow mold shell proximate the first annular groove.

34. The blow mold shell of claim 32, wherein said first cooling channel is disposed lengthwise within the wall of the blow mold shell proximate the sidewall portion of said container-defining cavity.

35. The blow mold shell of claim 33, wherein said second cooling channel is disposed within the wall of the blow mold shell proximate the neck portion end of the blow mold shell.

36. The blow mold assembly of claim 32, further comprising a shoulder insert that mates with and is affixed to the interior surface of the blow mold shell.

37. The blow mold assembly of claim 36, wherein the shoulder insert is located proximate to the neck portion of the blow mold shell.

38. The blow mold assembly of claim 36, wherein the shoulder insert further comprises an independent cooling channel.

39. The blow mold assembly of claim 36, wherein the shoulder insert further comprises a cooling channel that connects with cooling channels existing in the blow mold shell.

* * * * *